Oct. 29, 1935.  G. R. BOTT  2,018,701
BALL AND SIMILAR BEARING AND METHOD OF MANUFACTURING THE SAME
Filed Aug. 2, 1933
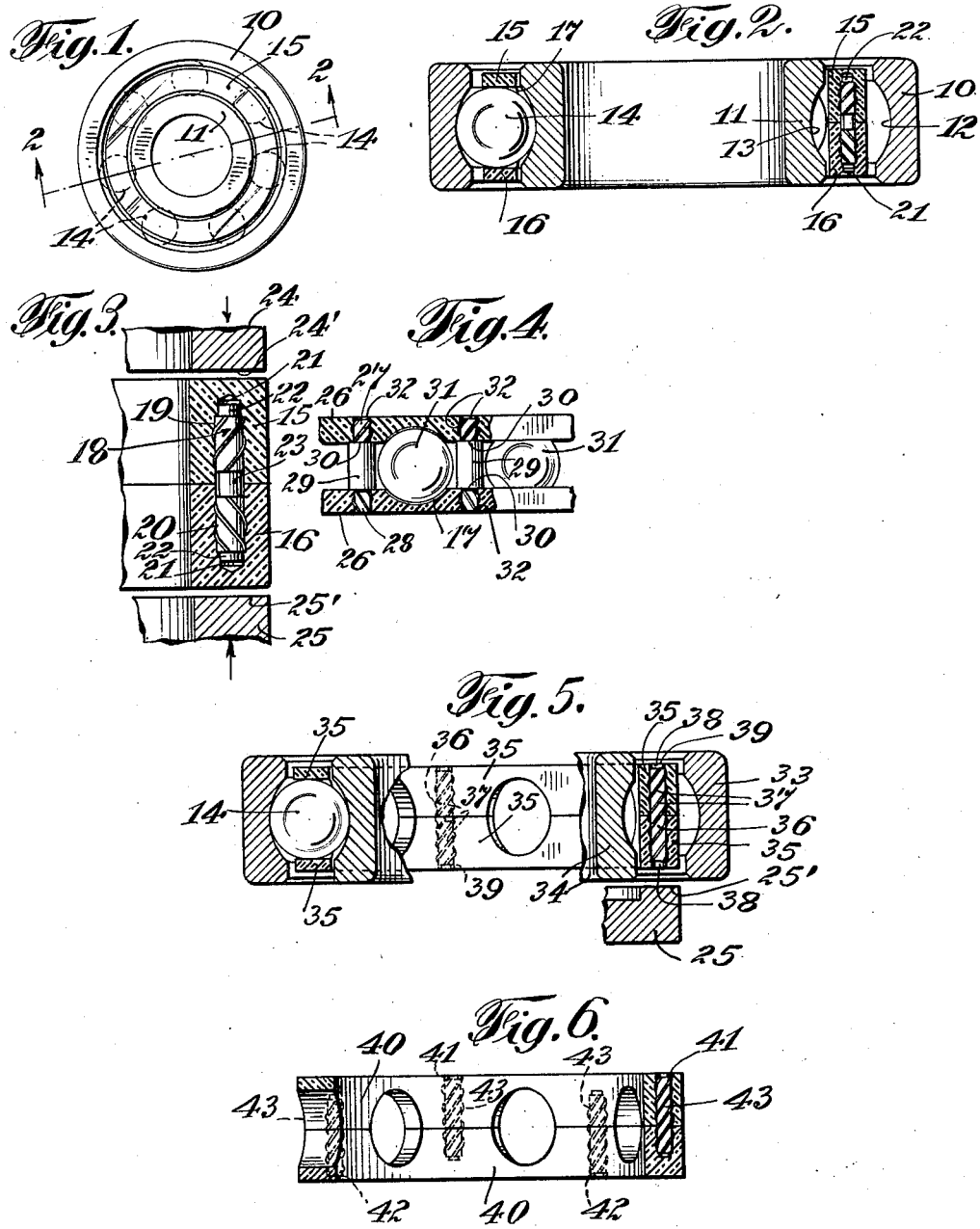
INVENTOR
George R. Bott
BY
his ATTORNEY Patented Oct. 29, 1935

2,018,701

UNITED STATES PATENT OFFICE 2,018,701

BALL AND SIMILAR BEARING AND METHOD OF MANUFACTURING THE SAME

George R. Bott, Stamford, Conn., assignor to Norma-Hoffmann Bearings Corporation, Stamford, Conn., a corporation of New York Application August 2, 1933, Serial No. 683,246

15 Claims. (Cl. 29—148.4)

This invention relates to improvements in ball and roller bearing devices and method of manufacturing the same.

In the manufacture of ball and roller bearings embodying two-part retainers or cages, manufacturers have constantly been confronted with the problem of so assembling and securing these parts together as to preclude the possibility of having them loosen under vibration, and especially with the problem of obtaining a permanent union or fastening by a method of procedure that will be easy, speedy and economical in its practical application.

For fastening the retainer parts, it has been a common practice to use rivets and these have been made of steel, bronze, brass, copper, etc., usually headed and in some instances, in order to provide flush retainer surfaces, the rivets have been made with tapered heads. The drilling of the retainers for the application of the rivets is a constant source of trouble, besides being time-consuming and costly, as the holes must precisely align, and again as the sizes of the rivets, particularly stock rivets, are limited, it is not always possible to obtain rivets which fit the prescribed holes with the degree of precision necessary to insure a permanent non-weaving fastening. Another disadvantage is found in the fact that the heads of the rivets and sometimes the rivets themselves lack in a substantial degree the necessary perfection. Still another disadvantage is found in the tendency of certain rivets to buckle, especially under circumstances requiring the use of relatively long rivets.

Where extremely high speeds and quiet operation are to be realized, the retainers should be made from bakelite or from resinous or similar materials, such, for instance, as the material commercially known as "Micarta." With these materials, the fastening problem is even more difficult, inasmuch as these materials, because of their character, do not afford a satisfactory support for the ordinary processes of riveting, whether of the vibratory or of the spinning varieties.

The purpose and object of my present invention are to overcome the foregoing disadvantages and objectionable features existent in assembling and fastening retainer parts; and, to that end, to provide for the assembling and the uniting of such parts in a permanent manner so that they will not shake loose and weave under vibration, and further to accomplish these results in a simple and efficacious manner irrespective of the character of the retainer parts, whether of fibrous, resinous or metallic materials.

I have found that the desired results may be accomplished by fastening or uniting the assembled retainer parts with screws having relatively long-bodied spirals which are hardened so that they will self-tap their own holes when hammered, driven or pressed into the solid materials of the two retainers. These devices require no finely matched holes as they easily and speedily form their own tight threads in the material as they advance therein. These self-tapping devices, irrespective of the character of the material, possess great holding power, will not shake loose and weave and cannot be removed from a retainer when once applied. For receiving them, proper sized holes may be drilled, punched or molded in the material, but tapped holes are not required. They will not crack the material and the hardened threads will not strip. They require no heads and this is distinctly advantageous in that the retainer surfaces are left flush and without obstructions and also in that when used in connection with fibrous or resinous materials there is nothing to cause flaking off or to otherwise damage the retainer surfaces.

The nature of my invention, its general principles and objects as above referred to, as well as other objects and advantages, and the manner in which my improvements may be embodied in practical form and means for the performance of the functions and the accomplishment of the results herein contemplated, will be hereinafter described, with reference to the examples illustrated in the accompanying drawing in which:—

Figure 1 represents a top plan view of a ball bearing device made in accordance with my invention;

Fig. 2 represents a vertical sectional view through the device, this view being taken on the line 2—2 of Fig. 1;

Fig. 3 represents a sectional detail on a larger scale, showing the retainer parts firmly united by a headless self-tapping reversely threaded fastener;

Fig. 4 is another sectional detail, showing retainer parts united by headless self-tapping reversely threaded fasteners formed with intermediate shouldered spacer bodies;

Fig. 5 represents a section and elevation of a roller bearing device, the inner concentric ring being partially broken away, and showing a fastener with multiple spiral threads permanently securing the retainer parts together;

Fig. 6 is another section and elevation, showing the retainer parts permanently fastened by headless fasteners applied in alternating relation from opposite sides of the parts; and With more particular reference to the accompanying drawing, and first to Figs. 1, 2 and 3, my invention for purposes of illustration is shown in connection with a ball bearing device including outer and inner concentric rings 10 and 11 provided with the usual raceways 12 and 13, respectively, for the ball elements 14. A retainer or cage, comprising complementary parts 15 and 16, herein represented as composed of solid fibrous material (but which in practice may consist of any suitable material), is disposed loosely between the concentric rings and is provided with spaced pockets 17 loosely retaining the ball elements for travel in the raceways in the usual way.

The two complementary retainer parts 15 and 16 are shown permanently secured together with their inner faces in firm engagement and contact for the full breadth of the parts. The retainer parts are united by cross fasteners in the form of screws 18 of which there is one embedded in the solid material existent between each two successive pockets. Each screw is headless and is made with two sections 19 and 20 of long-bodied spiral threads, of which one section is reversed with respect to the other. These spiral threads are hardened so that they will form their own tight thread grooves in the material when forced thereinto. In the retainer parts, parallel holes 21 to suit the diameters of the screw cores are drilled, punched or molded according to the nature of the material. At their opposite ends the screws may be, and preferably are, provided with suitable guide pilots 22 so that they will go in straight as the hardened threads cut their way into the material. Between the reversely threaded sections 19 and 20 is a reduced portion 23 for receiving displaced material.

To unite the retainer parts with the screws 18, assuming that one of the retainer parts is mounted between the rings with the ball elements in its pockets in the raceway grooves, the screws are applied to the holes in the mounted retainer part and then the other retainer part is applied and aligned so as to fit its holes to the projecting screws; whereupon the two retainer parts are squeezed together, pressure being applied from opposite directions, whereby to force the reversely threaded sections into the material. The forcing or squeezing operation is continued until the inner confronting faces of the two retainer parts are engaged in firm contact.

The two retainer parts may be forced together by hand, by any suitable tools, or by a press. For purposes of illustration, I have shown in Fig. 3, fragmentary press members 24 and 25 movable in the directions of the arrows therewith associated to force the retainer parts together from opposite directions. These press parts may, of course, be of annular form and should be made with anvil ends as 24', 25' of a size to easily come between the inner and outer rings if, as herein shown, the opposite outer surfaces of the retainer parts are to be within the outline of the concentric rings. It will be appreciated that instead of moving both of the press parts, as herein indicated, one of them may be stationary while the other is moved towards the same to effect the application of squeezing forces at the opposite sides of the two retainer parts.

Irrespective of the particular manner in which the opposing forces are applied, it is characteristic of my method that as one retainer part moves towards and into engagement and contact with the other, the hardened screw-threads will make their own cuts, forcing and binding the penetrated material between the spiral threads and throughout the long-bodied length thereof. The meaning and value of this is that a strong and permanent multiple anchorages are obtained that will not shake loose under vibration. It will be observed that the screws 18 are of appreciably less length than the combined thicknesses of the two retainer parts so that the outer faces of these parts will be smooth and entirely free of obstructions. The use of these fasteners in connection with retainer parts made of fibrous, resinous, or similar materials, is especially advantageous since there is no hammering to cause flaking of the outer surface and its supporting material.

In Fig. 4, I show complementary retainer parts 20 26 connected by fasteners having reversely threaded end sections 27 and 28 between which are integrally connected body portions 29 oversized to serve as spacing means. Shoulders 30 are provided at the opposite ends of the portions 29 and these shoulders abut against the inner faces of the opposing retainer parts. This type of fastener admits of the use of relatively thin retainer parts and results in the provision of a substantially open cage, the loose ball elements 31 alternating with the spacing fastener portions 29 coming between the retainer parts. Suitable holes 32 for receiving the thread sections may be drilled or molded in the retainer parts and after the ends of the fasteners have been inserted in the holes 35 of the two parts, assembly may be effected by forcing one of the parts towards the other so that the hardened spiral threads will form their own thread grooves in the material.

In Fig. 5, I give an example of ball bearings 40 including concentric raceway rings 33 and 34 between which is disposed a cage consisting of solid complementary retainer parts 35 connected by fasteners 36 the hardened spiral threads 37 of which are continuous between their pilot ends 38. These screws may be forced into the material by hammering or by using a press to force one of the retainer parts towards and against the other. As shown, these screws are of less length than the combined thicknesses of the retainer parts so that the holes adjacent the outer surfaces of the retainer parts will be open as at 39.

In the assembly shown in Fig. 6, the retainer parts 40 are provided with alternating holes as 41 and 42, so that the screws 43 may be entered alternately from the opposite outer sides of the parts. These screws may be hammered or otherwise forced into the material.

In all of the examples herein illustrated, the fasteners have long-bodied spirals which cut their own threads in the material and it will be recognized that the fasteners may be pressed, driven or hammered into the parts of the cage either by hand, or by the employment of simple fixtures, or with a simple press.

As each screw cuts its own individual threads obtaining thereby such holding power as to be practically non-removable, it will be appreciated that the multiple screws with which the cage parts are connected provide a cage structure which is staunch, solid and durable and the parts of which, each being tied to the other as if integrally connected, will not work loose or weave under rough handling or under the vibrations and forces incident to high speeds.

With the method of my invention, I can equip standard closed type bearings with two-part bronze or "Micarta" retainers at low cost. Whereas, heretofore, it has been necessary to make "bakelite" retainers in one piece at high cost, they can with my new method be made in two-piece bronze or "Micarta" in a very simplified manner and at low cost. My new method gives more latitude in fabricating for the trade standard bearings of high rotation characteristics, and for well-known types of standard bearings it renders unnecessary the removal of one of the lands of the outer rings and the ever-serious and troublesome process of assembling the retainers and rings by the snap process.

Although I have illustrated and described herein only ball bearing cages, it will be recognized that two-part roller bearing cages may be assembled in the same way as the ball bearing cages and permanently connected by the self-tapping fasteners, the only difference being that the roller bearing cages will have pockets shaped to accommodate roller elements instead of ball elements.

Other modes of applying the principles of my invention may be employed, instead of the selected ones herein given for clearance of understanding only, and no additional limitations should be understood therefrom, as I desire to avail myself of all adaptations and modifications permitted to me within the spirit of the claims.

I claim:—

1. The method of making ball and similar bearings which consists in forming corresponding holes in the opposing parts of the cage having the anti-friction elements and in directions substantially transverse to the plane of the cage and at definite intervals alternating with said elements, presenting self-tapping fasteners to the holes in the opposing parts, having reverse threads for the holes, then applying forces which act to cause the fasteners to penetrate following the holes and to cut their own threads in the material about the holes of the opposing parts, and so controlling the action of the penetrating self-tapping fasteners that they will penetrate and cut their threads along parallel lines.

2. The method of making ball and similar bearings which consists in forming corresponding holes in an assembly of retainers for the anti-friction elements and at spaced intervals thereabout substantially transversely to the plane of the assembly and in alternation with the anti-friction elements, presenting self-tapping fasteners to the holes of the assembly, having reverse threads for the holes, and in applying forces which act to cause the fasteners to penetrate following the holes and to cut their own threads in the material about the holes of the retainers to be thereby embedded therein and permanently fasten the assembly of retainers.

3. The method of making a cage for ball and like bearings which includes forming corresponding holes in the complementary retainers, holding the retainers inner end adjacent inner end with their corresponding holes in alignment, and then forcing thread cutting fasteners having reverse threads into the corresponding holes, to penetrate the material surrounding the corresponding holes and thereby embed the fasteners in the retainer for permanently connecting and fastening the same.

4. The method of making a cage for ball and like bearings which includes forming corresponding holes in the two complementary retainers, holding the retainers inner end adjacent inner end with their corresponding holes in alignment, disposing thread-cutting fasteners between the inner ends of the aligned corresponding holes, having reverse threads for the holes, and then forcing the retainers towards one another to cause reverse thread-cutting in the material surrounding the corresponding holes.

5. The method of making a cage for ball or like bearings which includes forming corresponding holes in two complementary retainers, initially inserting self-tapping fasteners in the inner adjacent ends of the corresponding holes of the two retainers, having reverse threads for the holes then applying force to the outer ends of the retainers so as to cause the fasteners to cut their own threads in the material of the retainers, and continuing the application of force until the inner adjacent ends of the two retainers meet in tight contact.

6. The method of fabricating ball and similar bearings which includes forming corresponding holes in two complementary retainers, inserting while the anti-friction elements are between the retainers the opposite self-tapping ends of fasteners in the inner adjacent ends of the corresponding holes of the two retainers with said fasteners disposed between the retainers to afford spaces for the same, and applying to the retainers a normal force simultaneously applied to all points on the outer faces of the retainers for pressing the latter together and causing the self-tapping ends to self-tap their way into the material of the retainers, and continuing the application of said force until the retainers permanently embed the self-tapping ends and are held rigidly spaced by the fasteners.

7. The method of fabricating a raceway type ball or similar bearings having outer and inner raceway rings and two separate retainer rings for spacing the ball elements in the raceway rings and having holes alternating with the ball elements, which consists in assembling the retainer rings with the holes thereof in registry, placing in aligned position to the registering holes self-tapping fasteners, having reverse threads for the holes, and forcing the fasteners to an effective depth into the aligned holes to penetrate and make their own thread cuts in the material surrounding the holes, thereby to permanently unite the retainer rings by the fasteners.

8. The method of permanently uniting two retainer rings of ball or roller type and composed of resinous stock, which consists in making transverse corresponding holes in the rings in the solid material thereof existent between the ball pockets thereof, positioning the rings so that the holes are in alignment, and then pressing into the aligned holes self-tapping screws having reverse threads for the holes, to penetrate and cut their own threads in the material of the stock surrounding holes.

9. The method of permanently uniting ball bearing retainers of resinous material, which consists in drilling, without tapping, corresponding holes in the solid material existent between the ball pockets, assembling the retainers so that the corresponding holes will be in alignment in sets, and then pressing a hardened screw-thread fastener having reverse threads with a guiding pilot into each set of aligned holes, and to a depth effective to embed the screw-threads entirely in the material surrounding both the holes.

10. In a ball bearing or like device including separate retainer rings holding ball elements and disposed in concentric rings, fasteners disposed in corresponding holes in the retainer rings between certain of the ball elements therein and having hardened long-bodied spirals embedded in the material surrounding the holes, the spirals of each fastener being reversed for at least one of the retainer rings and thus providing permanent connections for the two retainer rings and preventing any displacement thereof in either direction.

11. In a ball bearing or like device, two complementary retainers holding the antifriction elements and disposed between the raceway rings of the device, and cross fasteners uniting the retainers between certain of the elements, said fasteners having individual thread-cutting means engaged and embedded in the respective retainers, said means being reversed for at least one of the retainers, whereby to connect the two retainers permanently by reason of the engagement therewith of such reversed and embedded thread-cutting means.

12. In a ball bearing or like device, two complementary retainers adapted to enter the opening between the raceway rings of the device, and cross fasteners having individual thread-cutting means adapted to be engaged and embedded in the two retainers, the thread-cutting means of each fastener being reversed for at least one of the retainers wherein it is embedded, for connecting the retainers permanently by reason of the immovably embedded thread-cutting means.

13. In a ball bearing or like device, two complementary retainers adapted to enter the opening between the raceway rings of the device, cross fasteners for the retainers, each having individual thread-cutting means adapted to be engaged and embedded in the two retainers, said thread-cutting means being in two sections on each fastener, one of which is reversed for at least one of the retainers, and an oversized portion provided on each fastener between the two thread-cutting sections thereof adapted to serve as a stop between the retainers to limit the effective depths of the penetrations of the two thread-cutting sections into the retainers.

14. The method of making a cage for ball and like bearings which includes forming in two complementary retainers a plurality of corresponding holes, certain of which commence in the outer side of the first retainer and extend transversely therethrough and part way into the second retainer, and certain of which commence in the outer side of the second retainer and extend transversely therethrough and part way into the first retainer, the corresponding holes that commence in the outer side of the second retainer being out of alignment with those that commence in the outer side of the first retainer, initially inserting self-tapping fasteners into the corresponding holes according to the beginning thereof, thereby providing reversed fasteners for the unaligned holes, and applying forces which act to cause the fasteners to penetrate following the holes and to cut their own threads in the material around the holes, penetrating and cutting by reversed fasteners, and continuing the application of the forces until the fasteners entered through the outer side of the first retainer and those entered through the outer side of the second retainer are fully embedded in the retainers, with the inner sides of the two retainers in firm contact.

15. The method of permanently uniting separate retaining rings composed entirely of resinous material having finished surfaces and adapted to hold ball or like anti-friction elements, the steps which consist of forming, without tapping and without flaking the finished surfaces, corresponding transverse bores in the two resinous rings between certain of the ball elements, assembling the rings with the corresponding bores in alignment, initially applying to the aligned bores, cylindrical fastening devices with bodies of less diameter and less length than the aligned bores and having hardened long-bodied male spirals of greater diameter than the diameter of the bores, and hammering the devices entirely into the aligned bores, the male spirals thereby themselves cutting their internal counterparts into the resinous material surrounding the bores, the hammering operation being effected under control while protecting the finished surfaces of the rings against flaking and ending when the devices are embedded with their free terminals spaced inwardly from the corresponding finished outer faces of the united rings.

GEORGE R. BOTT.

CERTIFICATE OF CORRECTION.

Patent No. 2,018,701.  October 29, 1935.

GEORGE R. BOTT.

It is hereby certified that error appears in the above numbered patent requiring correction as follows: In the grant, and in the heading to the drawing and specification, title of invention should read Ball and Similar Bearings and Method of Manufacturing the Same instead of "Balls and Similar Bearings and Methods of Manufacturing the Same; and that the said Letters Patent should be read with this correction therein that the same may conform to the record of the case in the Patent Office.

Signed and sealed this 10th day of December, A. D. 1935.

Leslie Frazer

Acting Commissioner of Patents.

(Seal)